July 5, 1960
W. B. WESTCOTT, JR
2,943,820
TANDEM LANDING GEAR
Filed Sept. 18, 1956
3 Sheets-Sheet 1
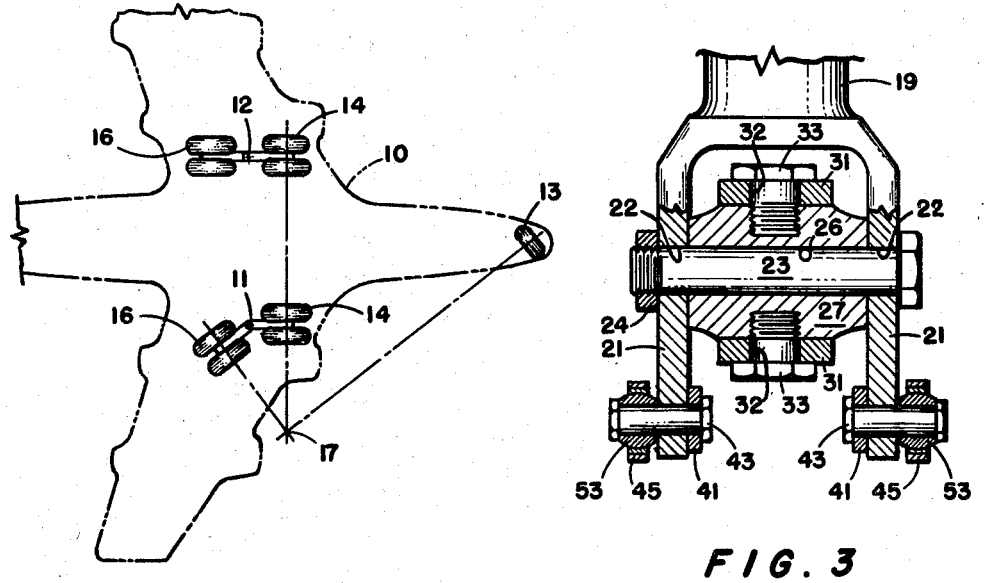
FIG. 1
FIG. 3
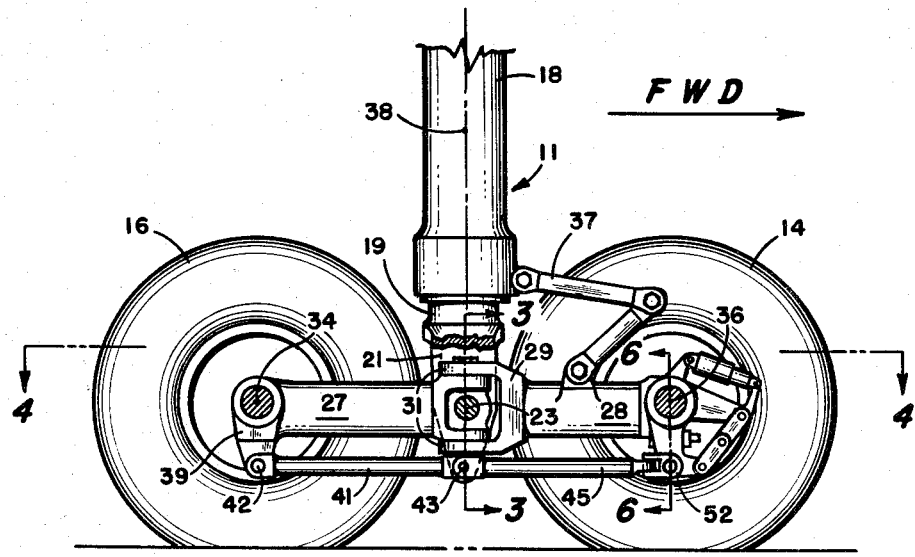
FIG. 2
INVENTOR.
WILLIAM B. WESTCOTT, Jr.
BY
ATTORNEY

United States Patent Office 2,943,820
Patented July 5, 1960

2,943,820
TANDEM LANDING GEAR

William B. Westcott, Jr., Cleveland Heights, Ohio, assignor to Cleveland Pneumatic Industries, Inc., a corporation of Ohio Filed Sept. 18, 1956, Ser. No. 610,471

8 Claims. (Cl. 244—50)

This invention relates to landing gears and more particularly to a new and improved tandem landing gear wherein the planes of wheel rotation are pivotable relative to each other so that the wheels track and will not scuff when the aircraft turns on the ground.

It is an important object of this invention to provide a new and improved tandem landing gear wherein the wheels can be pivoted relative to each other to prevent scuffing and the like during the ground handling of the aircraft.

It is another important object of this invention to provide a new and improved tandem landing gear having pivot wheel mountings in combination with releasable means for locking the pivot in a predetermined position so that the gear can be retracted.

It is still another important object of this invention to provide a tandem landing gear with pivoted wheel mountings in combination with means for locking the pivots wherein pre-existing structure is used to a great extent to perform the locking function.

Further objects and advantages will appear from the following descriptions and drawings, wherein:

Figure 1 is a schematic illustration of an aircraft equipped with pivoted landing gears illustrating the operating of the pivot structure during the ground maneuvering of the aircraft;

Figure 2 is a fragmentary side elevation of a preferred landing gear according to this invention;

Figure 3 is an enlarged fragmentary view taken along 3—3 of Figure 2 showing the pivot structure;

Figure 4:
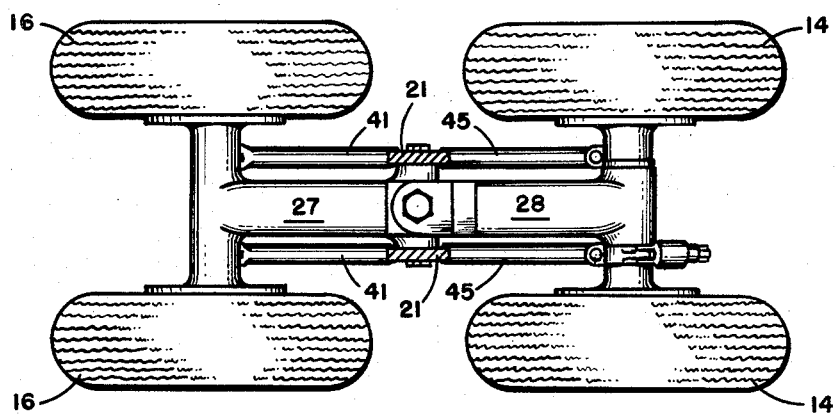
Figure 4 is a plan view taken along 4—4 of Figure 2 with parts removed for purposes of illustration showing the position the elements assume when the landing gear is in the straight ahead or forward position at which time the planes of wheel rotation are aligned with the major axis of the aircraft.

Referring to the drawings, in Figure 1 an aircraft 10 is schematically shown having tandem main gears 11 and 12, and a nose gear 13. The nose gear is steerable by conventional means so that the aircraft may be maneuvered on the ground. The main struts 11 and 12 are each provided with forward ground engaging wheels 14 and rearward ground engaging wheels 16. In both cases, wheel mountings are arranged so that the rearward wheels 16 of each strut can be pivoted in an outboard direction as is shown in the case of the main strut 11. If it is assumed that the aircraft is turning about a point 17, the rearward wheel 16 of the main strut 11 pivots so that all of the wheels of the main strut 11 roll around the point 17 without scuffing. In the preferred design, the wheels 16 of the main strut 12 cannot pivot inwardly so all of the wheels on the main strut 12 remain parallel to the major axis of the aircraft as the aircraft turns. This does cause some scuffing of the wheels 16 of the main strut 12, but since the distance between the turning point 17 and the wheels of the main strut 12 is relatively large, only a small amount of scuffing is encountered. In other words, when the aircraft is turning as shown in Figure 1, the wheels 16 of the main strut 11 which have a small turning radius can pivot so that there is no scuffing. The wheels of the main strut 12 have a much larger turning radius so scuffing is not excessive on this strut and the wheels 16 need not pivot. If the aircraft were turning in the opposite direction, the wheels 16 of the main strut 12 would pivot in an outboard direction and the wheels 16 of the main strut 11 would remain in the straight ahead position. Under such turning, the main strut 11 would be moving around a large turning radius and the main strut 12 would be turning around a small turning radius. Those skilled in the art will therefore recognize that the main strut having the small or short turning radius will pivot to eliminate scuffing, while the main strut having the larger steering radius need not pivot because the scuffing will not be excessive. This is true regardless of the direction of turning.

The main struts 11 and 12 are similar, so only a detailed description of the strut 11 will be given with the understanding that the structure of the main strut 12 is identical excepting that the elements are arranged in a mirror relationship. The main strut 11 includes a cylinder member 18 which is adapted to be mounted on the frame of an aircraft by suitable means. A piston member 19 projects into the cylinder 18 and is axially movable and rotatable around a central axis 38 relative thereto. The cylinder and piston members 18 and 19 co-operate to form a fluid spring which urges the piston 19 downwardly relative to the cylinder 18 and resiliently supports the weight of the aircraft when it is on the ground. The lower end of the piston 19 is formed with a mounting fork having opposed downwardly extending projections 21. Co-axial bores 22 are formed in the projections 21 to receive a pivot pin 23 fastened in place by a nut 24. The pivot pin 23 projects through a cross bore 26 formed in a rearwardly extending axle beam 27 so that the rearward axle beam 27 is pivotally mounted on the piston 19 for rotation around the axis of the pivot pin 23, which axis is perpendicular to and intersects the central axis of the strut 11. A forward axle beam 28 is formed with a mounting fork 29 having opposed projections 31 which embrace the forward end of the rearward axle beam 27. The projections 31 are each formed with a bore 32 through which aligned pivot pins 33 extend into the rearward axle beam 27, and are fixed thereto by any suitable means such as a threaded connection as is shown in Figure 3. The forward axle beam 28 is pivotally mounted on the rearward axle beam 27 for rotation around the axis of the pivot pins 33 which is perpendicular to and intersects the axis of the pivot pin 23. By utilizing this construction, the axle beams 27 and 28 are supported by the piston 19 and are capable of rotation as a unit in a vertical plane around the axis of the pivot pin 23 so that the axle beams can rotate relative to the piston 19 until the axle beams are parallel to the ground as the aircraft lands, regardless of the attitude of the aircraft. Also, the two axle beams 27 and 28 may pivot in a horizontal plane relative to each other to eliminate scuffing when the aircraft is turned on the ground.

To support the wheels 14 and 16, the axle beams 27 and 28 are provided with laterally projecting axles 34 and 36 respectively. The pair of wheels 16 are journaled on the axle 34 with one wheel on either side of the axle beam and the wheels 14 are journaled on the axle 36 with one of the wheels on either side of the axle beam 28. It is desirable to arrange the struts so that the forward axle beam 28 is always aligned with the major axis of the aircraft so that the wheels 14 are always in the straight ahead position. To accomplish this, I provide a pair of torque arms 37 which are connected between the cylinder 18 and the axle beam 28. The torque arms operate in a conventional manner to prevent relative rotation between the forward axle beam 28 and the cylinder 18 around the central axis of the strut while permitting relative motion therebetween in other directions. In order to have free motion of the forward axle beam 28 except around the central axis 38, it is necessary to proportion the elements so that the axis of the pivot pins 23 and 33 intersect the central axis 38 at the same point.

Normally, the axles 34 and 36 are mounted on the axle beams 27 and 28 respectively in such a manner that they can rotate relative to the axle beam around their own axis. It is also customary to form the axles with spaced depending arms which are connected to the piston 19 by tie bars at points spaced from the axis of the pivot pin 23 so that the braking reaction will not cause pitching of the axle beams. I prefer to utilize this same structure to lock the axle beams against relative rotation around the axis of the pivot pins 33. To that end, the axle 34 on each side of the axle beam 27 is provided with an integral depending projection 39 to which is pivotally connected, by a cross pin 42, one end of a tie bar 41. The other end of the tie bars are similarly connected, by cross pins 43, to the projections 21 of the piston member 19. The tie bars therefore form a parallelogram in co-operation with the projections 39 and 21 and the axle beam 27. Since the projections 39 are parts of the axle beam 27 and are rotatable therewith relative to the axle beams, the tie bars permit pivotal motion of the axle beam 27 around the axis of the pivot pin 23 but assist the pivot pin 23 in preventing relative rotation between the piston 19 and the rearward axle beam 27 in any other direction. Therefore, when the rearward axle beam 27 rotates relative to the forward axle beam 28 the piston 19 also rotates in the same direction through the same angle.

Figure 6:
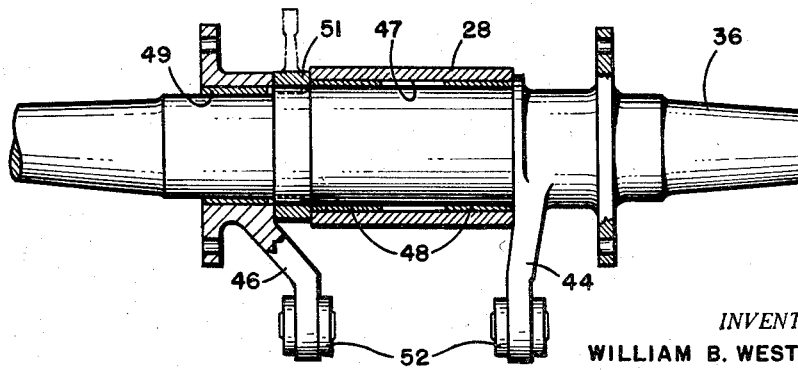
Figure 6 is an enlarged fragmentary view partially in section taken along 6—6 of Figure 2.
Figure 7:
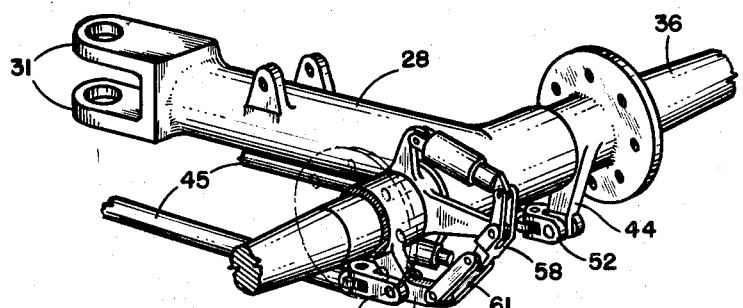
Figure 7 is a perspective view of the lock mechanism utilized to prevent the pivotal movement.

The forward axle 36 is provided with one depending projection 44 (Figures 6 and 7) which is fixed against rotation relative to the axle 36, and a second depending projection 46 which is journaled on the axle 36 for rotation relative thereto. In Figure 6, the structure is shown wherein the forward axle beam 28 is provided with a bore 47 in which the axle 36 is journaled on bearings 48. The depending projection 46 is in turn journaled on the axle 36 by sleeve bearings 49. Immediately adjacent to the bearings 49 is a ring 51 which is keyed to the axle 36 and is fixed against rotation relative thereto. Therefore, the ring 51 is rotationally fixed relative to the depending projection 44 and the projection 46 is rotatable relative to both the ring 51 and the projection 44. A shackle 52 is pivotally connected to each of the projections 44 and 46 and a tie bar 45 is pivotally connected between the associated shackle 52 and the projections 21. Because the relative rotation is possible between the forward axle beam 28 and the projections 21 which are formed on the piston 19, it is necessary to provide the shackle or universal joint structure 52 at the connection between the tie bars 45 and the associated projections 44 and 46. For the rearward end I provide spherical bearings 53 at the connection between the projections 21 and the tie bars 45. In Figure 3 the preferred structure is shown wherein the tie bars 41 are simply pinned to the projections 21 by a pivot pin 43 and the tie bars 45 are connected to the projections 21 by a spherical bearing 53 on the pivot pins 43.

Figure 10:
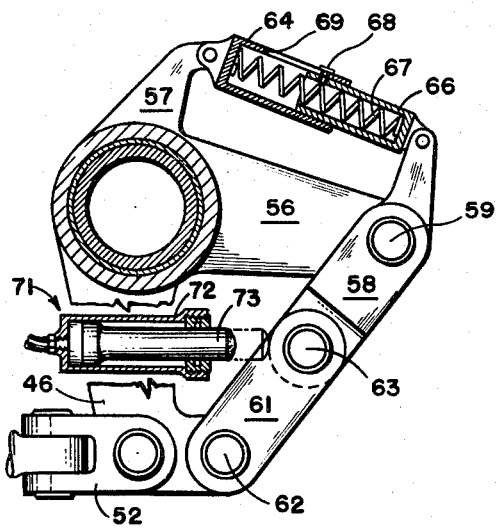
Figure 10 is a fragmentary view of the toggle linkage utilized to lock the mechanism showing the position the elements assume in the locked position; and, Figure 11 is a view similar to Figure 10 showing the position of the elements in the unlocked position.
Figure 11:
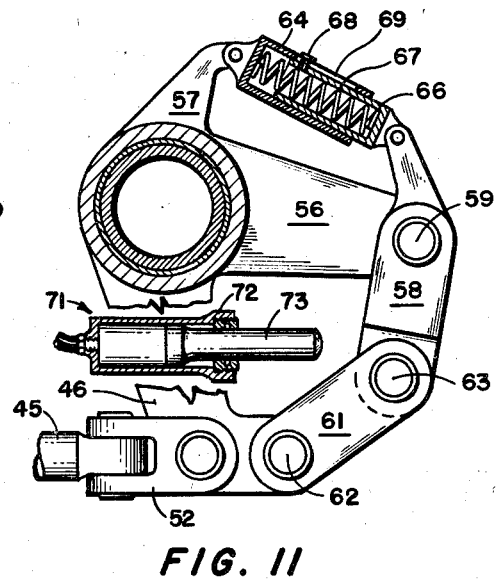

Because the projections 44 and 46 can rotate relative to each other, it is possible to have relative rotation between the forward axle beam 28 and the piston 19. However, if the two projections 44 and 46 are locked against relative rotation, a rigid system results and relative rotation between the forward axle beam 28 and the piston 19 is prevented. I therefore provide a releasable lock mechanism to normally prevent relative rotation between the projections 44 and 46. This lock mechanism is best shown in Figures 10 and 11. The ring 51 is formed with a first arm 56 which extends forwardly from the ring 51 and a second arm 57 which extends upwardly from the ring 51. A toggle linkage is connected between the projection 46 and the arm 56 and includes a first link 58 pivotally connected to the first arm 56 at 59 and a second link 61 is pivotally connected to the projection 46 at 62. The two links 58 and 61 are connected together at a pivot 63. This toggle connection prevents rotation of the projection 46 in a clock-wise direction beyond the position shown in Figure 10, at which time the two links 58 and 61 are substantially aligned.

Connected between the second arm 57 and the upper end of the link 58 is a pair of hollow telescoping members 64 and 66, and positioned within the hollow telescoping members 64 and 66 is a compression spring 67 which applies force tending to rotate the link 58 in a clock-wise direction around the pivot 59. A pin 68 mounted on the telescoping member 66 projects through a slot 69 formed in the telescoping member 64 and seats against the end of the slot to prevent axial motion of the telescoping member 66 relative to the telescoping member 64 to the right beyond the position shown in Figure 10. The various elements are in proportion so that the pivots 59 and 62 and 63 are all aligned when the elements are in this position. Therefore, the links 58 and 61 are locked and prevent rotation of the projection 46 relative to the arm 56 in either direction at this time, so the tie bars 45 lock the axle beam 28 and piston 19 against relative rotation. It may be desirable to proportion the elements so that the pivot 63 is slightly to the left of a line through the pivots 59 and 62 so that the toggle will be over center and capable of resisting compression forces. Since the axle beam 27 is already locked against rotation relative to the piston 19, the two axle beams 27 and 38 are thus locked against relative rotation around the axis of the pivot pins 33. Since the two axle beams are locked in a predetermined position at this time, it is possible to retract the gear and store it in a retraction area just large enough to receive it. Locking of the pivot structure is also desirable during the take-off and landing runs since no turning takes place at these times.

When it is desired to have the rearward axle beam 27 rotate relative to the forward axle beam 28, it is merely necessary to rotate the toggle so that the pivot 63 is not directly between the pivots 59 and 62 or in the over center position. I therefore provide a lock release fluid motor 71 having a cylinder 72 mounted on the forward axle beam 28 and a piston 73 axially movable relative thereto under the influence of fluid under pressure. Normally, the piston 73 is retracted to the position shown in Figure 10, but it moves in response to fluid under pressure to a forward position shown in Figure 11. As it moves to the forward position, it engages the link 61 overcoming the action of the spring 67 and moves the pivot 63 out of alignment between the pivots 59 and 62. When this happens, the toggle no longer locks the projection 46 against rotation relative to the projection 44 in one direction and the tie bars 45 then do not prevent relative rotation between the axle beam 28 and the axle beam 27. Therefore, the toggle serves as a normally locked releasable means for preventing relative rotation between the axle beams 27 and 28. Since the toggle only permits relative rotation between the projection 46 and arm 56 in one direction the axle beams 27 and 28 can rotate relative to each other in only one direction.

Figure 5:
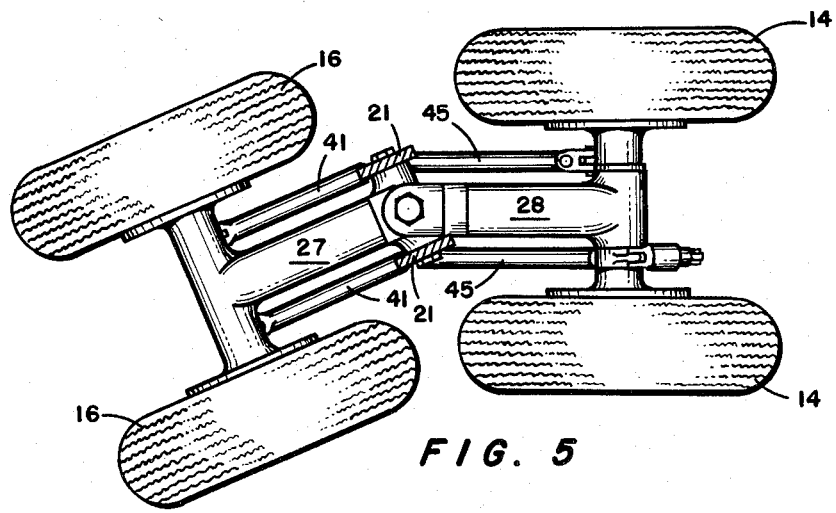
Figure 5 is a plan view similar to Figure 4 showing the position the elements assume when the wheels are pivoted to a position for turning of the aircraft.
Figure 8:
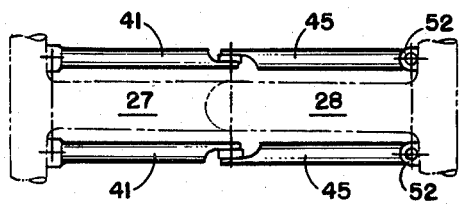
Figures 8 and 9 are schematic plan views showing the pivot operation.
Figure 9:
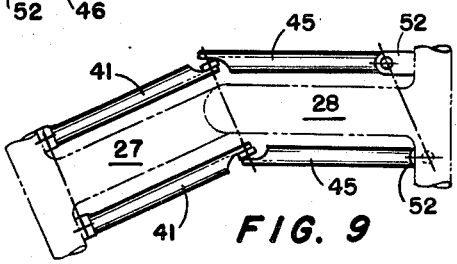

Reference should now be made to Figures 4 and 5, which show the strut in the locked or straight ahead position and the pivotal position respectively. When the two axle beams 27 and 28 are aligned, the planes of wheel rotation of the wheels 14 and 16 are aligned with the major axis of the aircraft, and it can move in the straight ahead position. However, when the aircraft turns, the rearward wheels 16 and the rearward axle beam 27 pivot to track the turning of the aircraft. During this pivotal movement, it is necessary for the projections 44 and 46 to rotate relative to each other. In Figures 8 and 9 wherein the mechanism is schematically shown with parts removed for purposes of illustration, the projections 44 and 46 do not appear but the shackles 52 which are attached to the projections 44 and 46 appear and show the comparison of the positions of the projections in the straight ahead and turning position. In Figure 8, the tie bars 45 co-operate with the forward axle beam 28 and the projections 21, 44, and 46 to form a rectangular figure which is rigid and prevents relative rotation between the two axle beams 27 and 28. However, when relative rotation is permitted between the projections 44 and 46, the rearward axle beam 27 can pivot to the position of Figure 9, causing relative rotation between the projections 44 and 46. When the axle beams return to the aligned position of Figure 8 after having pivoted as shown in Figure 9, the two projections 44 and 46 automatically go back to the initial position and the toggle returns to the position of Figure 10 under the influence of the spring 67 providing the piston 73 has been returned to its retracted position. Therefore, the mechanism automatically locks when the axle beams return to the aligned position.

When the lock mechanism is in the locked position of Figure 10, the tie bars 45 also serve the useful function of preventing pitching of the axle beam 28 when the brakes are applied on the wheel 14. The operation of the tie bars in preventing pitching of the axle beams during the braking operation is known in the art and forms no part in this invention excepting insofar as the same structure is utilized to prevent pivotal movement between the axle beams. By using the preferred structure disclosed, it is possible to provide a releasable locking mechanism which used predominately pre-existing structures in conventional tandem landing gears. Therefore, the preferred landing gear performs a new and useful function without additional complicated or expensive structure.

Although the preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed descriptions are determinative of the scope of the invention.

I claim:

1. A landing gear comprising a first horizontal axle beam with a ground engaging element mounted thereon, a second horizontal axle beam with a second ground engaging element mounted thereon, pivot means connecting said axle beams for relative motion around a vertical axis, a projection mounted to said second axle beam for movement relative thereto, tie bar means connected between said first axle beam and said projection at points spaced from said vertical axis, and releasable means connected to said projection normally controlling the position of said projection relative to said second axle beam thereby controlling relative rotation between said axle beams around said vertical axis.

2. A landing gear comprising a first horizontal axle beam with a ground engaging element mounted thereon, a second horizontal axle beam with a second ground engaging element mounted thereon, pivot means connecting said axle beams for relative motion around a vertical axis, a pair of spaced projections mounted on said second axle beam for movement of one projection relative to the other, force transmitting means connected between each projection and said first axle beam, and releasable means connected to said projections normally preventing relative movement therebetween thereby preventing relative rotation between said axle beams around said vertical axis.

3. A landing gear comprising a first axle beam with a ground engaging element journaled thereon, a second axle beam with a second ground engaging element journaled thereon, pivot means connecting said axle beams for relative motion around a vertical axis, a pair of spaced depending projections pivotally connected to said second axle beam for rotation of one projection relative to the other, tie bar means connected between each projection and said first axle beam at points spaced from said vertical axis, and releasable means connected to said projections normally preventing relative rotation between said projections and thereby preventing relative rotation between said axle beams around said axis.

4. A landing gear comprising a first axle beam with a ground engaging element journaled thereon, a second axle beam with a second ground engaging element journaled thereon, pivot means connecting said axle beams for relative motion around a vertical axis, a pair of spaced depending projections pivotally connected to said second axle beam for rotation of one projection relative to the other, tie bar means for each projection connected at one end thereto and at the other end connected to said first axle beam at points spaced from said vertical axis, locking means operatively connected between said projections releasably locking said projections against relative rotation therebetween and thereby preventing relative rotation between said axle beams, and operative means connected to said locking means adapted to release said locking means and permit relative rotation between said projections and in turn said axle beams.

5. A landing gear comprising a pair of telescoping members capable of relative rotation about an axis one of which is adapted to be mounted on the frame of an aircraft, first axle beam mounted on the other of said members fixed against rotation relative thereto in a plane perpendicular to said axis, a second axle beam supported by said other member for relative rotation therebetween in said plane, means connected between said second axle beam and said other member normally maintaining said axle beams in a predetermined relative position and releasable to permit pivotal motion in only one direction from said predetermined position, and torque means connected to one of said axle beams controlling the rotational position thereof around said axis.

6. A landing gear comprising a pair of telescoping members capable of relative rotation about an axis one of which is adapted to be mounted on the frame of an aircraft, and first axle beam mounted on the other of said members fixed against rotation relative thereto in a plane perpendicular to said axis, a second axle beam supported by said other member for relative rotation therebetween in said plane, torque means connected between said one member and said second axle beam preventing relative rotation therebetween in said plane, means connected between said second axle beam and said other member normally preventing relative rotation therebetween in said plane, and operative means connected to said last named means adapted to release said last named means thereby permitting relative rotation between said axle beams.

7. A landing gear comprising a pair of telescoping members capable of relative rotation about a first axis one of which is adapted to be mounted on the frame of an aircraft, a first axle beam pivotally mounted on the other of said members for relative rotation therebetween around a second axis perpendicularly intersecting said first axis, a second axle beam pivotally mounted on said first axle beam for relative rotation therebetween around a third axis perpendicular to said second axis and intersecting said second axis at its intersection with said first axis, a pair of spaced projections mounted on said second axle beam for movement relative to each other, tie bar means connected to each projection and to said other member, and releasable lock means connected to said projections normally preventing relative movement therebetween and thereby preventing relative rotation between said axle beams around said third axis.

8. A landing gear comprising a pair of telescoping members capable of relative rotation about a first axis one of which is adapted to be mounted on the frame of an aircraft, a first axle beam pivotally mounted on the other of said members for relative rotation therebetween around a second axis perpendicularly intersecting said first axis, a second axle beam pivotally mounted on said first axle beam for relative rotation therebetween around a third axis perpendicular to said second axis and intersecting said second axis at its intersection with said first axis, a pair of spaced projections mounted on said second axle beam for movement relative to each other, a tie element connected to each projection and to said other member, releasable lock means connected to said projections normally preventing relative movement therebetween and thereby preventing relative rotation between said axle beams around said third axis, and torque means connected to one of said axle beams controlling the rotational position thereof around said first axis.

References Cited in the file of this patent

UNITED STATES PATENTS

| 2,390,912 | Ayers | Dec. 11, 1945 |
| 2,483,027 | Van Zelm et al. | Sept. 27, 1949 |

FOREIGN PATENTS

| 707,791 | Great Britain | Apr. 21, 1954 |
| 1,080,662 | France | June 2, 1954 |